Jan. 24, 1950
J. L. HOOK
2,495,584
ELECTRIC OUTLET BOX
Filed Sept. 20, 1946
2 Sheets-Sheet 1
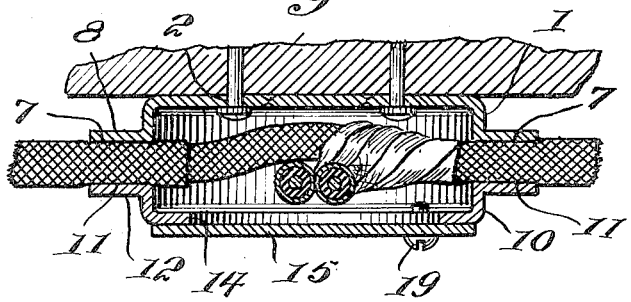
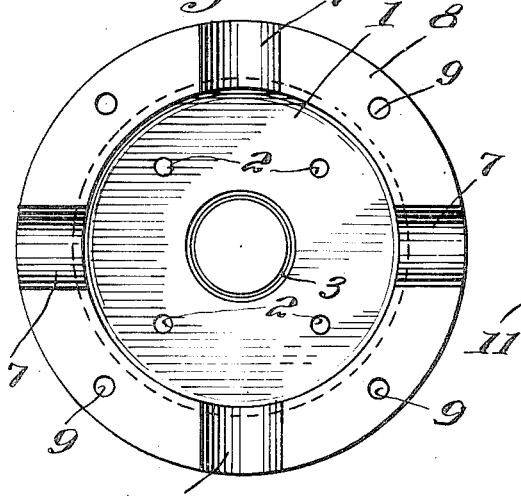
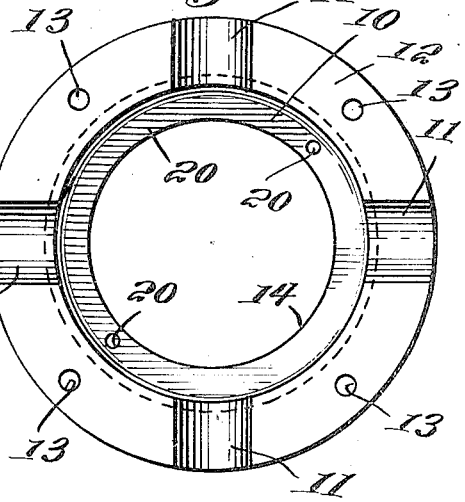
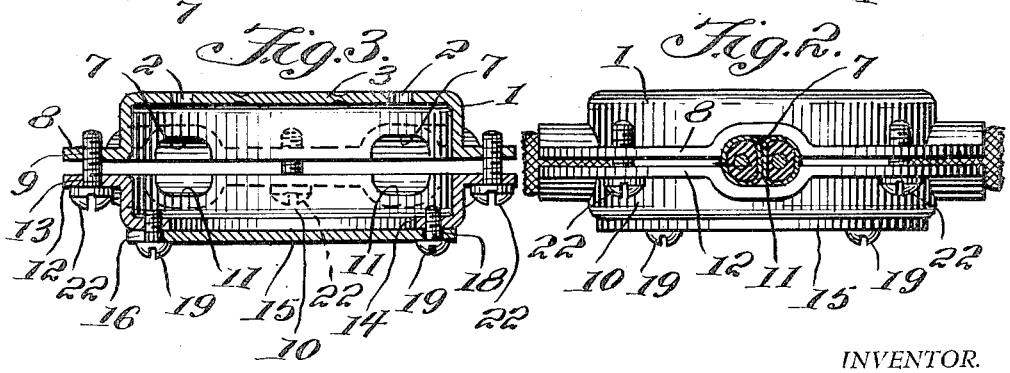
INVENTOR.
John Leroy Hook,
BY Victor J. Evans & Co.
ATTORNEYS Jan. 24, 1950 J. L. HOOK 2,495,584
ELECTRIC OUTLET BOX
Filed Sept. 20, 1946 2 Sheets-Sheet 2
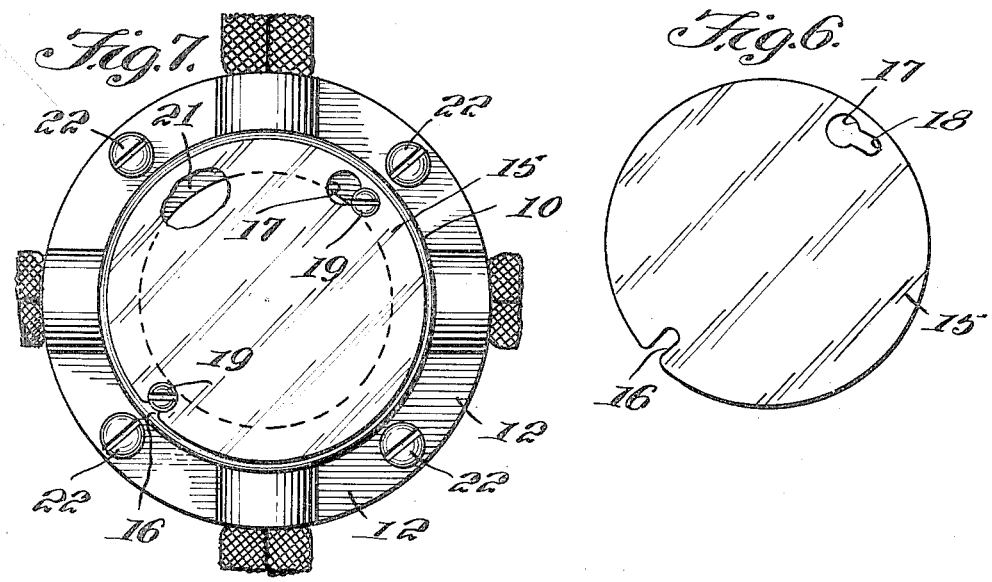
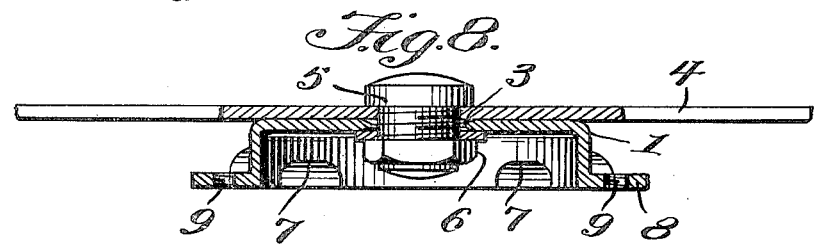
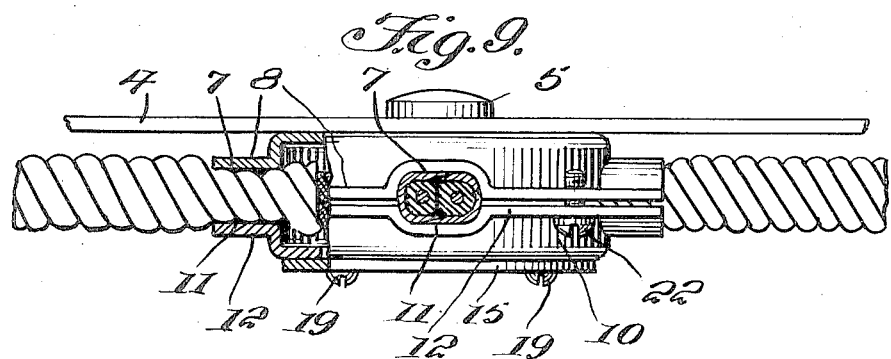
INVENTOR.
John Leroy Hook, Patented Jan. 24, 1950

2,495,584

UNITED STATES PATENT OFFICE 2,495,584

ELECTRIC OUTLET BOX

John Leroy Hook, Auburn, Ind.

Application September 20, 1946, Serial No. 698,369

1 Claim. (Cl. 220—3.2)

This invention relates to improvements in electric outlet boxes, and has for an object the provision of an outlet box of simple structure which can be made from a plastic material or from metal.

A further object of the invention is to provide an electric outlet box of such construction that time is saved in the manufacture thereof, there being no bushings to put in place before the box can be fastened to a support. The box can be made on a press in two operations, and thus lowering the cost of manufacture.

A further object is the provision of an outlet box for electrical connections, the box having two simple parts which are secured together by screws, which are loosened to enable wires to be inserted in the box, after which the screws are tightened to hold the wires in place for the attachment of an electric fixture or electric outlet plug.

These and other objects are attained by the novel construction and arrangement of parts hereinafter described and illustrated by the accompanying drawings, forming a part hereof, and in which:

Fig. 1 is a sectional view of an outlet box embodying the invention, showing cables inserted in the box.

Fig. 2 is a side view of the box.

Fig. 3 is a cross sectional view of the box.

Fig. 4 is a plan view of one section of the box.

Fig. 5 is a plan view of another section of the box.

Fig. 6 is a plan view of a cover plate for the box.

Fig. 7 is a plan view of the box with cover thereon.

Fig. 8 is a sectional view of a section of the box mounted on a hanger.

Fig. 9 is a view showing the box mounted on the hanger and receiving BX wire casing.

Referring to the drawings, the outlet box is shown to comprise a lower section 1 having a plurality of holes 2 by means of which it can be attached to a wall or other support by screws or nails. The section 1 also has a knock-out 3 which enables it to be supported by a hanger 4 by means of a threaded bolt and nut 5 and 6 as shown in Fig. 8. The section 1 has a flange 8 with four grooves 7 and threaded holes 9 for attaching section 1 to the other section of the box by screws.

In Fig. 5 is shown the other section 10, which is similar to section 1 by having cooperating grooves 11 in a flange 12, and threaded holes 13 to receive screws for holding the two sections together. The section 10 has a center aperture 14, which is covered by a cover plate 15 having a slot 16 on one side and a circular aperture 17 communicating with a slot 18 on the other side, the slots and apertures being adapted to fit over screws 19 (see Fig. 3) screwed into threaded holes 20 in the flange 21 of section 10.

In practice the screws for securing the sections together, the screws being indicated by the numeral 22, are loosened, the cover plate 15 being removed, to enable wires and cables or the like to pass through the grooves 7 and 11, which register with each other to provide substantially tubular passages. The box is secured to a support by nails or screws through the holes 2, or secured to a hanger by a bolt and nut as shown in Fig. 8. After the wires have been positioned in the box and arranged as desired for the connection thereto of a fixture or the like, the cover plate 15 is put in place over the screws 19, this being an easy operation due to the slots 16 and 18.

The box can be made of a plastic material or of metal, and it is obviously easily formed as it requires no bushings and the like, there being only two parts which are easily formed, and inexpensive to manufacture.

The above description is to be considered as illustrative and not limitative of the invention of which modifications can be made without departing from the spirit and scope of the invention as set forth in the appended claim.

The invention having been described, what is claimed is:

In an outlet box, a circular disk shaped section made of a plastic nonconducting moldable material having an annular flange with grooves spaced at 90 degree intervals, said section having a knock out disc and a plurality of holes so that means for securing the section to a support can pass through the section after the knock out disc has been removed or the holes in the section, a second similarly shaped section having a similarly shaped flange with similarly shaped grooves cooperating with the grooves in the first section to provide passages for conduits, each of said flanges having threaded holes intermediate of said grooves to receive screws to secure the sections together, said second section having an aperture, threaded openings in said second section about the aperture therein, screws in said openings and a cover plate having slots therein, said slots adapted to be engaged by the screws to secure the plate to the second section to cover said aperture.

JOHN LEROY HOOK.

(References on following page)

REFERENCES CITED

The following references are of record in the file of this patent:

UNITED STATES PATENTS

| Number | Name | Date |
|---|---|---|
| 946,646 | Pratt | Jan. 18, 1910 |
| 1,456,792 | Franke | May 29, 1923 |
| 2,329,442 | Popp | Sept. 14, 1943 |
| 2,362,794 | Benander | Nov. 14, 1944 |
| 2,380,793 | Rugg | July 31, 1945 |

FOREIGN PATENTS

| Number | Country | Date |
|---|---|---|
| 146,802 | Austria | Aug. 25, 1936 |
| 363,799 | Great Britain | Dec. 31, 1931 |